Patented Aug. 28, 1928.

1,682,251

UNITED STATES PATENT OFFICE.

FRANK H. RIDDLE, OF DETROIT, MICHIGAN, ASSIGNOR TO CHAMPION PORCELAIN COMPANY, OF DETROIT, MICHIGAN, A CORPORATION OF MICHIGAN.

CERAMIC MATERIAL.

No Drawing.   Application filed September 9, 1922.  Serial No. 587,223.

My invention has for its object to provide vitreous ceramic bodies that are hard and tough and have a relatively high modulus of elasticity, a high specific gravity, a low specific heat, and the desired physical and chemical homogeneity; or bodies that have a high dielectric strength at atmospheric and higher temperatures; or bodies that have a high thermal conductivity and low coefficient of thermal expansion, or bodies that have a high heat resistance or refractoriness, or bod:es that have any number of these characteristics.

Also variations and degrees of these physical properties may be produced in the different ceramic products embodying my invention, as for example, some of the ceramic products embodying my invention may find their greatest utility because of their mechanical strength as against shock or vibration. By my invention these valuable properties may be varied to produce the maximum efficiency for the particular purposes for which the products may be designed by varying the composition and the heat treatment in the formation of the porcelain bodies.

Thus the ceramic products embodying my invention may be used as electrical insulators for collecting electrodes for separation of suspended particles in such processes as the Cottrell process, for ball mill linings, for grinding balls, for textile eyelets used as runners or guides for textiles, for cooking or table ware, chemical porcelain or for any other ceramic products where any or all of the above mentioned characteristics are desirable.

Porcelain body batches are formed by using mixtures of various proportions of fluxing materials, refractory materials and clay, the proportion of the clay used being such that when the minimum amount of raw clay is used, the necessary plasticity and practical working properties are obtained. Ordinary china porcelain has heretofore been used for many of the purposes above mentioned, but china porcelain and the like is not efficient because it does not have the desired physical properties or they do not exist in the required degree.

I have discovered that alkaline earth metal fluxes produce in ceramic bodies an increased toughness and hardness. Also I have found that the toughness and hardness is increased when certain refractories, such as synthetic sillimanite, natural sillimanite, andalusite and cyanite are used. I have also discovered that when certain refractories are used in the production of ceramic products the thermal properties are improved, and that when such refractories are used with alkaline earth metal fluxes, the insulating properties of the ceramic bodies are also improved particularly at increased temperatures. Such refractories are synthetic zirconium silicate or the mineral silicate known as zircon. By the term refractory, I mean that part of the ceramic mixture that may be formed of one or more ingredients which acts as part of the non-plastic in the raw body batch and is the most inert part of the body when fired or the last part to become fused in the firing. The refractories specifically mentioned herein have a fusing point above 1760° C. when in a substantially pure state.

By the use of various amounts of these materials as ingredients of the batches of the ceramic products embodying my invention, the above described properties may be produced therein in various and substantially predetermined degrees, so that, if desired, the products may be given the properties that will produce in them the maximum efficiency according to the particular uses to which they are to be put.

The alkaline earth metal flux or fluxes used in forming the batches to produce the ceramic products embodying my invention may be composed of or formed from any of the alkaline earth metal compounds and introduced in the form of mineralogical or raw compounds or in the form of prepared compounds. The fluxing constituent may be introduced through definite hard, calcined, vitrified or fused minerals or through definite hard, calcined, vitrified or fused synthetic compounds. The refractory constituents of the batches are formed of one or more chemically and mineralogically definite, dense or stable materials, such as synthetic sillimanite, the mineral sillimanite, andalusite, or cyanite, or zirconium silicate, or the mineral zircon, or of compounds that form refractory silicates when fired. The synthetic ingredients may be prepared by prefiring from suitable raw materials containing the elements of which the synthetic compounds are formed, such as by firing clay and alumina or zirconia and clay in proper proportions, or if desired synthetic compounds of the alkaline earth fluxes, and refractories may be formed so as to produce in each case a synthetic compound containing the refractory and the flux.

One or more of the refractories may be combined with one or more of the alkaline earth fluxes, or a mixture of one or more of the refractories may be made with one or more alkaline earth fluxes. The refractory inserted in the flux may be in synthetic combination with the flux or it may be a synthetic refractory, or it may be a raw refractory. Calcined clay may be also inserted to increase the clay content and to prevent shrinkage.

Where the plastic property of the batch is low an organic temporary binder or a cementitious fluxing compound or compounds may be used. Certain of the ingredients other than the clays may be used to give the desired plastic property to the batch in order that bodies may be shaped therefrom and the shape maintained during the drying and firing operations. Such materials may be the refractories or may constitute the fluxes in the body batch, such as bauxite, zircon and talc, when ground to sufficient fineness. The mixtures may be altered according to the method of formation of the ceramic bodies, that is, as to whether the body is to be cast or jiggered, pressed or made up by some other method and according to results to be produced in the final body.

The proportions of the ingredients used in the batch are such that on firing the body to the required temperature definite end products are formed, such as the conversion of the clay to sillimanite $3Al_2O_3 2SiO_2$ or to the silicate or silicates of the refractory or to the refractories contained in the batch or the conversion of refractory silicates to refractories having a lower proportional amount of silica, such as the conversion of sillimanite mineral, $Al_2O_3 SiO_2$, to artificial sillimanite, $3Al_2O_3 2SiO_2$. In this way the artificial sillimanite that is formed from the clay becomes an additional amount of refractory in the final body and the silica that splits off from the clay in the formation of the artificial sillimanite from the clay may combine with the refractories in the batch to produce a further addition to the refractory constituent of the final body, or to form silicates with the fluxing oxides of the alkaline earth metal compounds that produce the glassy matrix or the silica may enter into solution with the glassy matrix. These reactions cause the resultant product to be practically in chemical and physical equilibrium.

The properties of the final product may be controlled in the following general way. The hardness or toughness is controlled by the proper proportion of the alkaline earth metal compound and the inert material, such as calcined clay, cyanite, artificial and natural sillimanite, and andalusite, or mixtures of these refractories. The toughness is increased by the use of the inert material or materials in about the order named. The dielectric strength is controlled by the proper proportion of the alkaline earth metal compound with one or more of the refractories, such as artificial and natural sillimanite, andalusite and zircon or zirconium silicate, the insulating property being increased in the order that the refractories are named. Greater dielectric results are obtained by using either cyanite, artificial and natural sillimanite or andalusite with zircon or zirconium silicate, the increased results obtained being in the order that the refractories of the sillimanite group are named. Probably the best dielectric, thermic and mechanical results are obtained by the mixture of the alkaline earth metal flux with andalusite and zirconium silicate, or the mineral zircon, the zirconium silicate or zircon being in excess of the amount of the andalusite. This mixture when properly fired produces bodies wherein the thermal conductivity and the thermal expansion are greatly improved since the conductivity is increased and the expansivity is lowered by the use of zirconium silicate or the mineral zircon in the body batches.

I have discovered that the use of andalusite produces not only substantially the same mechanical strength that synthetic sillimanite produces, but it also increases the hot dielectric strength. I have also discovered that zirconium silicate or the mineral zircon when used in the body batches either acts or coacts to increase the hot dielectric strength, the specific gravity, the thermal conductivity and the resistance to sudden extreme thermal changes. These properties are, moreover, modified, that is, varied from minimum to maximum effects, by the various proportions of the various ingredients, and by the various temperature conditions used in the preparing of the ingredients of the body batch, if such ingredients are prefired, and the various temperature conditions used in firing the body batch to produce the final product.

The temperature necessary for maturing of the body may be merely that necessary to produce a glassy matrix, which will give to the porcelain body the properties of the refractory or refractories used. Increasing the maturing temperature by reduction of the flux quantity, or by increase of the refractory constituent of the flux, will increase the amount of the refractory produced in the body upon maturity of the body. Increasing the maturing temperature increases the degree of the particular physical property or properties of the refractory or refractories formed in the body or introduced in the body batches by reason of the fact that the refractory produced pyro-chemically in the body, forms minute binding crystals that unite the material or materials of the body together in addition to the binding effect produced by reason of the existence of the glassy matrix. The greater the quantity of the refractory that is pyro-chemically produced in the body the smaller will be the amount of the glassy matrix that is produced, but with a result that the binding action occurring within the body is greatly increased since the binding action of the refractory thus produced in the body is greater than that of the glassy matrix. It is, however, desirable in certain bodies that sufficient amount of glassy matrix be formed so as to maintain a desired homogeneity and density in porcelain bodies when used for certain purposes. Thus in order to obtain the physical properties in the ceramic products in various degrees the flux used is varied according to the refractory or refractories used and according to the amount of the refractory or the proportion of the refractories, if more than one is used, and according to the quantity of calcined clay used, if calcined clay is used. The glassy matrix in the final body may therefore be varied from an imperceptible amount to an amount sufficient to produce a highly vitrified body.

Variations in the properties will also be according to the preparation of the flux. The flux may be prepared for the body batch by forming a synthetic combination of the fluxing oxides with aluminous or zirconious materials. Thus a synthetic compound of flux and artificial sillimanite, or a synthetic compound of flux and zirconium silicate may be formed, using in forming the synthetic compound either sillimanite or zirconium silicate, natural or synthetic, or forming in the synthetic compound containing the fluxing oxides, synthetic sillimanite or synthetic zirconium silicate by using aluminous or zirconious materials, such as alumina or zirconia, and silicious materials.

If too much of the flux is used either in the preparation of the ingredients for the batch, or is introduced directly without first combining with other materials, the physical properties of the final body are also modified. If there is an excess of the flux, the body will mature before the proper pyro-chemical reactions take place, which reduces the degree of the corresponding physical property that it is desired to be obtained by the use either of the flux itself or by the use of one or the other of the types of refractories. It might, however, be found desirable to produce a body maturing at a lower temperature, particularly for practical operating reasons, in which case the property or properties produced in the final bodies by the use of the flux or the refractory selected, will be somewhat modified, and yet such degree of development of the property or properties may be, for practical purposes, sufficient to warrant the use of a lower maturing batch.

For the flux, talc or whiting may be used. I have found that the addition of whiting operates to increase the hot dielectric strength over that which is produced by talc alone.

In preparing the synthetic flux I use from 1% of the alkaline earth metal oxide contained in a flux material to 40% of such oxide and the balance of other ingredients of the flux batch. The other ingredients of the flux batch may be clay alone, or clay and alumina, or clay and zirconia, or clay and silica, or alumina or zirconia and silica. Where clay and alumina is used the alumina may vary from a minute quantity thereof to 16% and the balance of clay. Where clay and silica is used the amount of silica may vary from a minute quantity to 30% and the balance of clay. Where the alumina and silica is used the amount of the alumina may be varied from 5% to 55% and the balance of silica. Where zirconia is used the amount will vary from a minute quantity to 65%.

If synthetic sillimanite is to be formed in the flux compound the quantity produced is preferably kept sufficiently low relative to the quantity of magnesium aluminum silicate produced, that the ingredient still constitutes a flux as distinct from a refractory material, since refractories are also introduced in the body batch. By increasing the refractory constituent of the flux, the maturing temperature of the flux compound is raised. This raises the maturing temperature of the body batch when the flux compound is mixed with the other ingredients of the body batch. Thus the maturing temperature of the body batch may be controlled by varying the relative quantities of the constituents of the body batch. A more thorough and better pyrochemical reaction is produced if at least a part of the refractory element of the body batch is introduced through the synthetic compound containing at least a part of the fluxing constituent of the body.

Thus the flux batch may be formed of materials that have in combination from 1% to 40% of the alkaline earth metal oxides and from a minute amount to 66% of the refractory which may be formed of one or more refractory compounds and the balance of clay. Where clay and alumina is also used in the flux batches the amount of the alumina may vary from a minute quantity to 16%, and the refractory may vary from a minute quantity to 66% and the balance of clay. Likewise where clay and silica is used the silica may vary from a minute quantity to 30% and the refractory from a minute quantity to 66% and the balance may be formed of clay. Where alumina and silica is used the amount of the alumina may vary from 5% to 55% and the refractory from a minute quantity to 66% and the balance may be formed of silica. Any one of the refractories, such as synthetic sillimanite or the mineral sillimanite, andalusite or cyanite or zirconium silicate or zircon may be used. If a refractory is inserted into the body batch through the synthetic compound containing also the flux, the amount of refractory that is inserted by itself will of course be less than if none were inserted through the synthetic compound containing the flux.

The body batch may thus be formed of materials that have in combination ¼ of 1% to 5% of the alkaline earth metal oxides. The refractory constituent may be from a minute quantity to 95%. These proportions may be used when the refractory contains a sufficient quantity of fines, which, with the fluxes and with the addition of a small amount of moisture, will enable the formation of the body from the batch by a small amount of pressure preparatory to the firing of the body. When clay is used the raw batch may be formed of from ¼% to 5% of the oxides of the alkaline metals of the flux, a minute quantity to 90% of the refractories, and the balance of clay, the refractory being introduced, as stated above, either with the flux in a synthetic compound or in both the synthetic compound and by itself or by being formed from compounds having the refractory forming constituents.

In the following tables I have given some of the preferred formulæ to produce different physical properties in the final body:

Table No. 1.

| Calcine A, flux, cone 12. | Calcine B, refractory cone 18–20. | Raw batch of the body. | Calculated end products of body, cone 17. | Collected totals. | Totals on 100% basis. |
|---|---|---|---|---|---|
| MgCO₃ ———— 40.74<br>ZrO₂ ———— 59.26 | Al₂O₃ ———— 44.00<br>Clay ———— 56.00 | Calcine A ———— 20<br>Calcine B ———— 40<br>Ball clay ———— 10<br>Kaolin ———— 30 | 3Al₂O₃2SiO₂ ———— 40<br>3Al₂O₃2SiO₂ ———— 22<br>(from clay)<br>MgO ZrO₂ ———— 20<br>Silica ———— 12.4<br>Water ———— 5.6 | 62.0<br><br><br><br>32.4 | 65.6<br><br><br><br>34.4 |
| 100.00 | 100.00 | 100 | 100.0 | 94.4 | 100.0 |

Table No. 2.

| Raw batch of the body, cone 17. | Collected end products of fired body. | Totals on 100% basis. |
|---|---|---|
| ZrO₂ ———— 30.6<br>Kaolin ———— 54.9<br>Ball clay ———— 9.5<br>Talc ———— 5.0 | Zirconium silicate ———— 45.50<br>3Al₂O₃2SiO₂ ———— 35.42<br>Glassy matrix ———— 9.83<br>Water (driven off) ———— 9.25 | 50.13<br>39.03<br>10.84<br>— |
| 100.0 | 100.00 | 100.00 |

Table No. 3.

| Raw batch of the body, cone 18. | Collected end products of fired body. | Totals on 100% basis. |
|---|---|---|
| Zircon ———— 39.10<br>Talc ———— 4.90<br>Alumina ———— 6.16<br>Kaolin ———— 40.04<br>Ball clay ———— 9.80 | Zircon ———— 39.10<br>3Al₂O₃2SiO₂ ———— 27.45<br>3Al₂O₃2SiO₂ (from clay) ———— 8.58<br>Glassy matrix ———— 4.70<br>Silica ———— 13.02<br>Water (driven off) ———— 7.15 | 42.11<br>38.80<br><br>19.09<br><br>— |
| 100.00 | 100.00 | 100.00 |

Table No. 4.

| Raw batch of the body, cone 17-18. | Calculated end products in fired body. | Collected end products of fired body. | Totals on 100% basis. |
|---|---|---|---|
| Andalusite ........................ 20 | $3Al_2O_3 2SiO_2$ ........................ 17.52 | 36.77 | 38.75 |
| Zircon ........................ 40 | Zircon ........................ 40.00 | 40.00 | 42.16 |
| Talc ........................ 5 | Glassy matrix ........................ 4.77 | 18.10 | 19.09 |
| Ball clay ........................ 10 | $3Al_2O_3 2SiO_2$ (from the clay) ........................ 19.25 | | |
| Kaolin ........................ 25 | Silica ........................ 13.33 | | |
| | Water (driven off) ........................ 5.13 | | |
| 100 | 100.00 | 94.87 | 100.00 |

Table No. 5.

| Raw batch for synthetic sillimanite and zircon and flux—cone 18. | Raw batch for the body. | Calculated end products of body, cone 18. | Collected end products of fired body. | Totals on 100% basis. |
|---|---|---|---|---|
| Talc ........................ 10.00 | Calcine ........................ 42.29 | Zirconium silicate ........................ 23.55 | 23.55 | 25.17 |
| Clay ........................ 55.10 | Alumina ........................ 16.33 | $3Al_2O_3 2SiO_2$ ........................ 13.73 | 65.64 | 69.80 |
| Zirconia ........................ 34.90 | Ball clay ........................ 10.00 | $3Al_2O_3 2SiO_2$ (from clay) ........................ 51.91 | | |
| | Kaolin ........................ 31.38 | Glassy matrix ........................ 4.70 | 4.70 | 5.03 |
| | | Water (driven off) ........................ 6.10 | | |
| 100.00 | 100.00 | 100.00 | 93.89 | 100.00 |

With reference to the above formulæ, it is to be noted that a part of the sillimanite mineral and zirconia compounds is likely to go into solution in the glassy matrix. In firing, the sillimanite mineral, $Al_2O_3 SiO_2$, breaks down and forms artificial sillimanite, $3Al_2O_3 2SiO_2$, that has a crystal formation very similar to that of the mineral. Also in preforming the artificial sillimanite, the union of the silica and alumina may not be complete and the free molecules or parts may possibly interact with other materials in the batch.

The formulæ given in Tables 3 and 4 produces apparently the best results for spark plug porcelains wherein the desirable properties are that of mechanical strength and hot dielectric strength. The composition of Table No. 4, by reason of the presence of andalusite and zircon, in what is believed to be the best relation or proportions, produces a still greater efficiency as to hot dielectric strength and mechanical strength as well as probably the best thermic conditions.

The compositions are prepared either for the flux batches or the body batches by the usual processes of grinding, milling, blunging and filter pressing, so that they may be readily mixed to form the batches and so that the body batches may be shaped into the body forms in preparation for the kiln by any of the processes known to the art. The bodies in the dry green state are by virtue of the nature and amount of the non-plastic constituents contained therein, dense, but lightly bonded and friable, and are therefore exceptionally rapid cutting by any means of dry forming known to the art.

The bodies may be glazed or unglazed, depending upon the use to which the objects are to be put. The fitting of the glaze may require certain changes in the body compositions well known in the ceramic art. It is, however, preferable that the glaze composition be so composed as to fit the body instead of altering the body composition to fit the glaze. The glaze may also be applied to the raw, or to the bisque body according to the methods of manufacture and the results desired.

For convenience we have used in the appended claims the term "mullite" to specify the anhydrous aluminum silicate, having apparently the formula $3Al_2O_3 2SiO_2$, formed by heating aluminous and siliceous material under proper conditions to sufficiently high temperatures.

I claim:

1. A raw batch for a ceramic body comprising andalusite, zirconium silicate and aluminous and silcic compounds.

2. A raw batch for ceramic bodies containing andalusite, zirconium silicate, clay and fluxing compounds.

3. A raw batch for ceramic bodies containing a mineral of the sillimanite group, zirconium silicate, other aluminous material and fluxing compounds.

4. A raw batch for ceramic bodies containing andalusite, zirconium silicate and refractory clays.

5. A raw batch for ceramic bodies containing a mineral of the sillimanite group, zirconium silicate, alakaline earth metal fluxing compounds and clay.

6. A raw batch for ceramic bodies containing a mineral of the sillimanite group, zirconium silicate, magnesium compounds and clay.

7. A raw batch for ceramic bodies containing andalusite, zirconium silicate, magnesium compounds and clay.

8. The process of forming a ceramic body which consists in firing a mixture containing a zirconium compound, andalusite and clay and forming mullite from both the andalusite and clay.

9. A raw batch for ceramic bodies containing a zirconium compound and an anhydrous alumium silicate mineral.

10. A raw batch for ceramic bodies containing a zirconium compound and an anhydrous aluminum silicate mineral and an hydrous aluminum silicate material.

11. A raw batch for ceramic bodies containing a zirconium compound and an anhydrous aluminum silicate mineral and a flux.

12. A raw batch for ceramic bodies containing a zirconium compound and andalusite.

13. A raw batch for ceramic bodies containing a zirconium compound, andalusite and a flux.

14. A raw batch for ceramic bodies containing a zirconium compound, andalusite and clay.

15. A raw batch for ceramic bodies containing a zirconium compound, andalusite, ball clay, kaolin and magnesium oxide.

16. A batch for insulator porcelain consisting of 50% to 75% refractory material substantially stable against volumetric changes under heat, 20% to 45% clay, and alkaline earth metal flux, the said refractory material consisting of zircon and andalusite.

17. A batch for insulator porcelain constituted substantially of 20% andalusite, 40% zircon, 5% talc, 10% ball clay and 25% kaolin.

In testimony whereof, I have hereunto signed my name to this specification.

FRANK H. RIDDLE.